(12) United States Patent
Oku

(10) Patent No.: US 7,891,735 B2
(45) Date of Patent: Feb. 22, 2011

(54) HOOK MEMBER AND LATCH STRUCTURE OF UPHOLSTERY MATERIAL

(75) Inventor: Kenichi Oku, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 80 days.

(21) Appl. No.: 12/259,499

(22) Filed: Oct. 28, 2008

(65) Prior Publication Data
US 2009/0121528 A1    May 14, 2009

(30) Foreign Application Priority Data
Nov. 7, 2007    (JP) .............................. 2007-289635

(51) Int. Cl.
*A47C 31/00* (2006.01)
(52) U.S. Cl. ................. 297/218.3; 297/218.5
(58) Field of Classification Search .............. 297/218.1, 297/218.2, 218.3, 218.5
See application file for complete search history.

(56) References Cited

U.S. PATENT DOCUMENTS

| | | | | |
|---|---|---|---|---|
| 3,233,253 | A | * | 2/1966 | Cauvin .......................... 5/402 |
| 3,423,775 | A | * | 1/1969 | Cockerill ....................... 5/404 |
| 3,981,534 | A | * | 9/1976 | Wilton ..................... 297/218.1 |
| 5,409,198 | A | * | 4/1995 | Roick .......................... 267/107 |
| 5,478,134 | A | | 12/1995 | Bernard et al. |
| 5,503,454 | A | * | 4/1996 | Sakamoto ................. 297/218.1 |
| 5,820,213 | A | | 10/1998 | Severinsky |
| 5,879,051 | A | * | 3/1999 | Cozzani .................... 297/218.3 |
| 6,612,648 | B1 | * | 9/2003 | Hashiguchi .............. 297/218.1 |
| 6,745,444 | B2 | * | 6/2004 | Moilanen ..................... 29/91.1 |

FOREIGN PATENT DOCUMENTS

| | | |
|---|---|---|
| CA | 1035872 | 8/1978 |
| CH | 593041 | 11/1977 |
| DE | 69402438 | 10/1997 |
| EP | 1464535 | 10/2004 |
| JP | 2003-169979 | 6/2003 |
| JP | 2003-169979 A | 6/2003 |

OTHER PUBLICATIONS

English language Abstract of JP 2003-169979 A.
Germany Office action, dated Oct. 20, 2010 along with an English-language translation thereof.

* cited by examiner

*Primary Examiner*—Sarah B McPartlin
(74) *Attorney, Agent, or Firm*—Greenblum & Bernstein, P.L.C.

(57) ABSTRACT

A hook member is provided and includes a pinching portion that pinches a plate body of a seat frame, a fixing portion that can fix an upholstery material, and an introduction portion defining an opening into the fixing portion, wherein the fixing portion faces an outer side of the plate body and is pinched by the pinching portion, and includes the introduction portion having a curved shape and defining an opening for the upholstery material to enter and be fixed therein.

8 Claims, 4 Drawing Sheets

HOOK MEMBER AND LATCH STRUCTURE OF UPHOLSTERY MATERIAL

This application claims priority to Japanese patent application serial number 2007-289635 the contents of which are incorporated hereby reference.

BACKGROUND OF THE INVENTION

1. Field of the Invention

The present invention relates to a hook member for connecting an upholstery material covering a vehicle seat on a seat frame, and a latch structure of the upholstery material using the hook member.

2. Description of the Related Art

A type of latch structure of the upholstery material, a latch structure using two hook members (each having a J-shaped longitudinal section), is described in JP-A-2003-169979. The hook members can be engaged with each other.

In the latch structure, an upholstery material covers a surface side of a vehicle seat. In addition a first hook member attaches to one end of the upholstery material. A second hook member attaches to the other end of the upholstery material. Then the first hook member and the second hook member are engaged with each other in an opposed manner at a back side of the seat.

However, in this configuration, when the upholstery material is pulled by tension exerted during seating of a passenger, the opposed hook members are relatively easily disengaged from each other. Therefore, the configuration has not been able to stably latch the upholstery material on the vehicle seat.

SUMMARY OF THE INVENTION

The present invention can include a hook member includes a pinching portion that pinches a plate body of the seat frame, a fixing portion that can fix the upholstery material, and, an introduction portion defining an opening into the fixing portion, wherein the fixing portion is in an opposed configuration to the plate body at an outer side of the plate body and is pinched by the pinching portion, and includes the introduction portion having a curved shape and defining an opening for the upholstery material to enter and be fixed therein.

DETAILED DESCRIPTION OF THE INVENTION

Each of the additional features and teachings disclosed above and below may be utilized separately or in conjunction with other features and teachings to provide the hook member and the latch structure of upholstery material. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Hereafter, a description will be given with reference to FIGS. 1 to 4 of a best mode for carrying out the invention. In FIG. 2, a hook member is emphatically shown in a large manner as compared with actual size in order to better show each detail. In each figure, a reference letter F will be given to a front side of a vehicle seat, a reference letter B to a back side of a vehicle seat, reference letter I to a inside of a vehicle seat, and a reference letter L to a lateral side of a vehicle seat.

Figure 1:
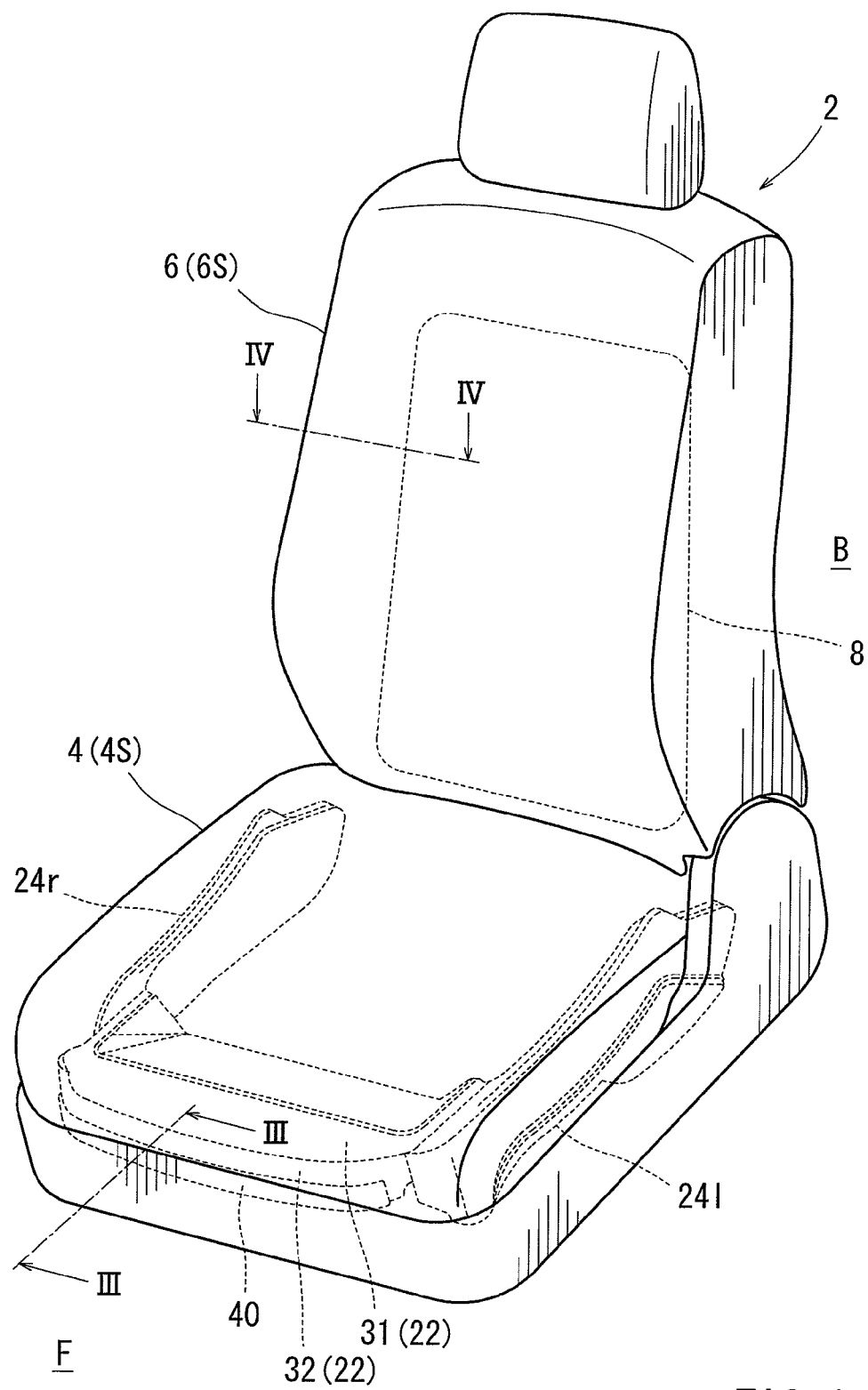
FIG. 1 is a perspective view of a vehicle seat.
Figure 2:
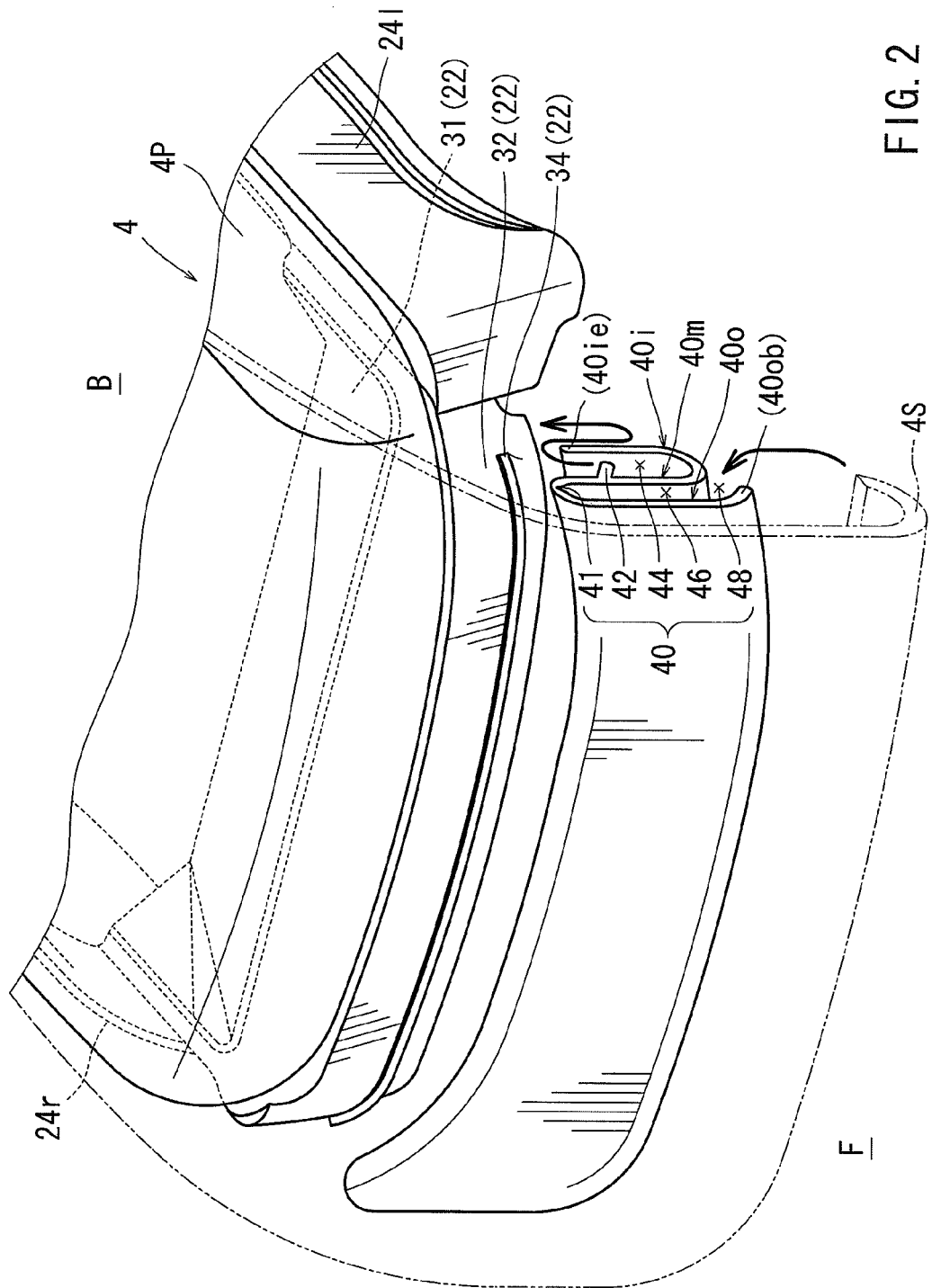
FIG. 2 is a perspective view showing a latch structure in an exploded manner.

Referring to FIG. 1, a vehicle seat 2 includes a seat cushion 4 and a seatback 6. Surfaces of such components are covered with an upholstery material (4S or 6S).

Embodiments described below use a structure where a hook member 40 (40A) is used to stably latch the upholstery material 4S (6S) covering the seat cushion 4 (seatback 6) on a seat frame.

FIRST EMBODIMENT

A latch structure is described with reference to FIGS. 1 to 3, which connects the upholstery material 4S on a forward end of the seat cushion 4.

Referring to FIGS. 1 and 2, the seat cushion 4 is formed in an approximately rectangular shape (in a front view), of which the four corners have curved shapes respectively. The seat cushion 4 has a forward frame 22 (corresponding to the "seat frame") configuring a forward framework, and a pair of lateral frames 24r and 24l configuring lateral frameworks. The seat cushion 4 includes a pad member 4P disposed on each frame via a cushion pan (not shown), and a surface of the pad member 4P is covered by the upholstery material 4S.

The forward frame 22 has an upper frame 31 and a front plate body 32. The pad member 4P is disposed on the upper frame 31. The front plate body 32 is extended vertically downward with respect to the upper frame 31.

(Front Plate Body)

The front plate body 32 is a plate-like member configuring a seat forward end. Referring to FIGS. 2 and 3, either end of the front plate body 32 is curved to the seat back side B.

The front plate body 32 has a protruding portion 34 extending to the seat front side F. The protruding portion 34 is formed along a full width area at a forward side of the front plate body 32 (including two curved ends).

The protruding portion 34 can be formed by cutting and raising one portion of the front plate body 32. Specifically, the protruding portion 34 can form a horizontal cut by partially cutting the front plate body 32 in a thickness direction thereof, then raising a lower edge of the cut obliquely upward with respect to the front plate body 32 (such that an inclination angle θ1 is less than 90°).

(Hook Member)

Figure 3:
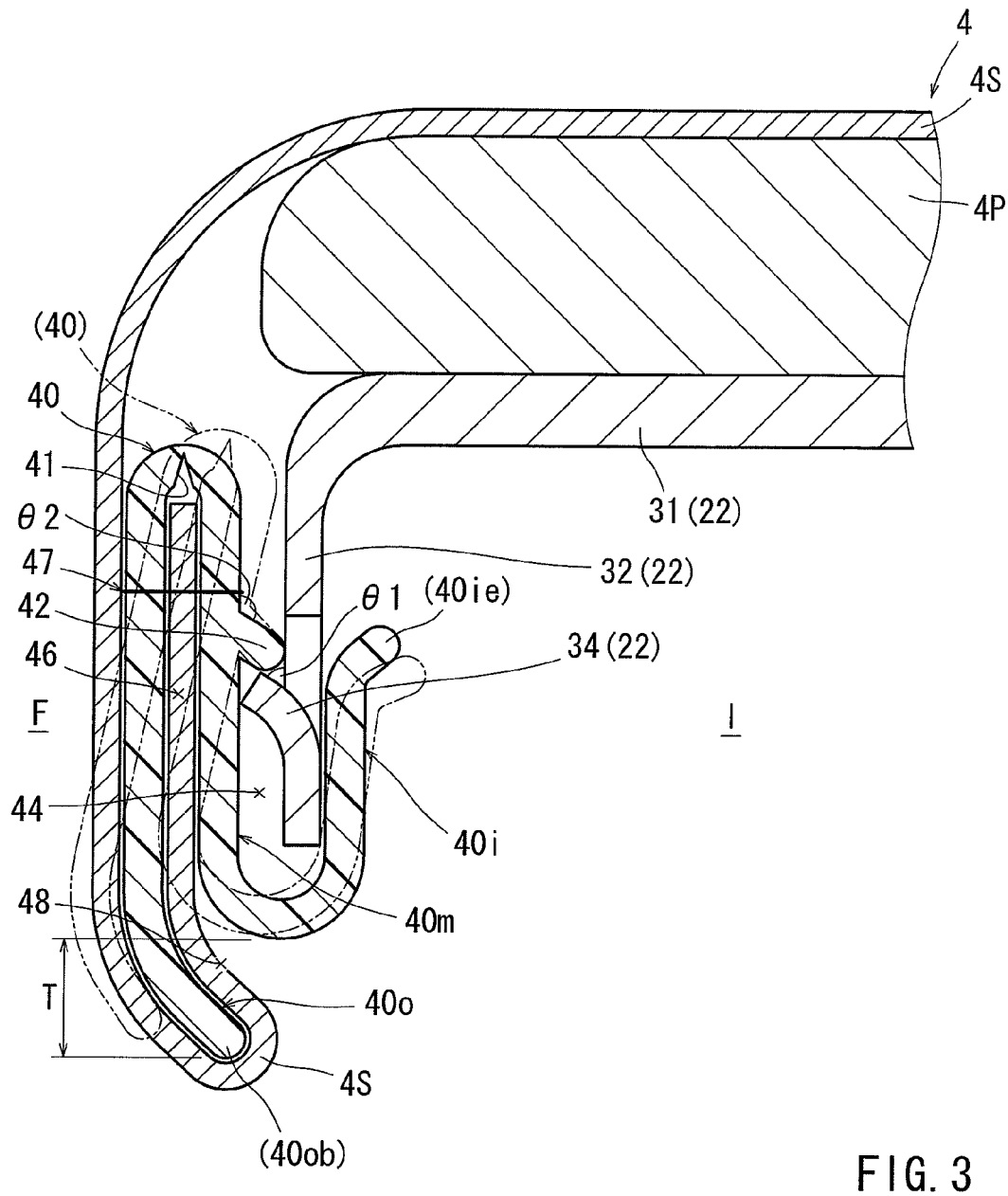
FIG. 3 is a cross section view along a line III-III in FIG. 1.

Referring to FIGS. 2 and 3, the hook member 40 is a long, belt-like member having flexibility. Hook member 40 can have sufficient length dimension to be attachable to the full width area at the forward side of the front plate body 32. Further, hook member 40 can be made of resin molding (typically, polypropylene or polyethylene molding and the like). Referring to FIG. 2, the hook member 40 is configured by plate pieces (inner plate piece 40*i*, intermediate plate piece 40*m*, and outer plate piece 40*o*). Three plate pieces are disposed in an opposed manner to one another with a predetermined space, and are in series in an approximate sideways-S-shape in a side view.

The hook member 40 has a pinching portion 44, a fixing portion 46 and an introduction portion 48. As described later, the pinching portion 44 pinches (or contacts either side of) the front plate body 32. The fixing portion 46 fixes the upholstery material 4S. The introduction portion 48 defines an opening for the upholstery material 4S to be positioned adjacent to the fixing portion 46.

The pinching portion 44 is formed between a pair of plate pieces 40*i* and 40*m* (in an approximate U-shape in a side view). Plate pieces 40*i* and 40*m* are oppositely disposed in a manner of being opened at an upper side of the pair.

A width dimension of the pinching portion 44 (gap dimension between the plate pieces 40*i* and 40*m*) can be set to be approximately the same as a thickness dimension of the front plate body 32 so that the pinching portion 44 can pinch the front plate body 32 (the width dimension is shown to be slightly wider in FIG. 2 as a matter of convenience). When the front plate body 32 is inserted into the pinching portion 44 (plate pieces 40*i* and 40*m*), plate pieces 40*i* and 40*m* are bent and deformed so as to be separated from each other, thereby the width dimension of the pair of plate pieces 40*i* and 40*m* is widened.

An upper part (free end 40*ie*) of the inner plate piece 40*i* is a component of the pinching portion 44, and thus has an expanded shape. The free end 40*ie* is slightly curved toward the seat inside I. Therefore, the front plate body 32 is easily inserted into the pinching portion 44.

The intermediate plate piece 40*m* is a component of the pinching portion 44, and thus is designed such that it can be opposed to the protruding portion 34 of the front plate body 32. The intermediate plate piece 40*m* has a hooking portion 42 to be engaged with the protruding portion 34. The hooking portion 42 is formed in a protruding manner obliquely downward with respect to an inner surface of the intermediate plate piece 40*m* (such that an inclination angle θ 2 is more than 90°).

The fixing portion 46 is formed between another pair of plate pieces 40*m* and 40*o* (in an approximate inverted-U-shape in a side view). Plate pieces 40*m* and 40*o* are oppositely disposed in a manner of being opened at a lower side of the pair. Plate pieces 40*m* and 40*o* (the fixing portion 46) are connected to each other in an openable and closable manner via an integral hinge portion 41 so as to easily grasp the upholstery material 4S. The integral hinge portion 41 has a groove shape.

The fixing portion 46 (plate pieces 40*m* and 40*o*) is configured such that it is opposed to the pinching portion 44 (plate pieces 40*i* and 40*m*) in a closed state. The fixing portion 46 in the closed state is opposed to the front plate body 32 at the front side F (outer side) in a condition that the front plate body 32 is pinched by the pinching portion 44 as described later.

The introduction portion 48 is formed continuously to a lower part of the fixing portion 46 (the pair of plate pieces 40*m* and 40*o*). The introduction portion 48 is proximate a lower part (free end 40*ob*) of the outer plate piece 40*o*. The free end 40*ob* is shaped to be curved to a side of the front plate body 32 in accordance with a seat profile. The upholstery material 4S is introduced into the fixing portion 46 through the introduction portion 48.

Referring to FIG. 3, the introduction portion 48 is configured to be extended downward by a length dimension T compared with the pinching portion 44 (plate pieces 40*i* and 40*m*). Therefore, the pinching portion 44 (plate pieces 40*i* and 40*m*) is hidden by the introduction portion 48 when the upholstery material 4S is introduced therein, and thereby hardly seen from the seat front F, as described later.

(Latch Structure of Upholstery Material)

Referring to FIG. 3 (a condition shown by a solid line), a surface side of the seat cushion 4 is covered by the upholstery material 4S. One end of the upholstery material 4S is disposed in the fixing portion 46 in an opened state. Then the fixing portion 46 is closed to grasp the one end of the upholstery material 4S. One aspect of this embodiment includes the fixing portion 46 being fixed together with the upholstery material 4S by a sewing portion 47, which is set to be in a position higher than the inner plate piece 40*i*. The fixing portion 46 can be easily sewed using a sewing machine of the like without being obstructed by the inner plate piece 40*i*.

Otherwise, the sewing portion 47 can set to be in a position near the introduction portion 48 so that the fixing portion 46 is hardly expanded, if sewing can be done in such a configuration.

Then the pinching portion 44 pinches the front plate body 32. The hooking portion 42 of the pinching portion 44 is in a hooked state (rotatable state) on the protruding portion 34 of the front plate body 32. Thus, the upholstery material 4S is latched on the front plate body 32.

The upholstery material 4S is therefore introduced from the introduction portion 48 (having a curved shape in accordance with a seat profile) into the fixing portion 46 (in an opposed configuration to the front plate body 32). Specifically, the upholstery material 4S covers the outer side, being shaped to have a seat profile, and extends into the introduction portion 48. The upholstery material 4S is curved to a side of the front plate body 32 and into the introduction portion 48. Further, the curved upholstery material 4S is fixedly accommodated in the fixing portion 46 made to be opposed to the front plate body 32.

According to the latch structure, the upholstery material 4S can be compactly latched, and can be curvedly stretched in accordance with a seat profile by the introduction portion 48. In addition, the introduction portion 48 hides the pinching portion 44. Therefore, the upholstery material 4S can be aesthetically latched on the seat cushion 4.

Referring to FIG. 3 (a condition shown by a broken line), even if the upholstery material 4S is pulled upward by tension exerted during seating of a passenger, the upholstery material 4S is latched on the curved introduction portion 48 to resist the tension. This leads to reduction in tension (force in an extraction direction) exerted on the upholstery material 4S of the fixing portion 46.

Furthermore, the hook member 40 is in a hooked state (rotatable state) on the protruding portion 34 of the front plate body 32. Therefore, even if the upholstery material 4S is pulled, the hook member 40 can prevent disengagement from the front plate body 32. In addition, the hook member 40 rotates in a tension direction in an engaging portion of the front plate body 32, which further reduces tension directly exerted on the upholstery material 4S of the fixing portion 46.

According to the latch structure, the upholstery material 4S covering the seat cushion 4 can be stably latched on the front plate body 32 of the seat forward end.

SECOND EMBODIMENT

A latch structure that latches the upholstery material 6S covering the seatback 6 is described with reference to FIGS. 1 and 4. As a basic structure of the second embodiment is almost identical to that of the first embodiment, a detailed description common structures and the like will be omitted by using the same reference numerals or letters.

The seatback 6 (in an approximately rectangular shape in a front view) has a pad member 6P, a backboard 8 and a back frame 26. The pad member 6P is disposed at a seat surface side of the seatback 6. The backboard 8 is disposed in back lining of the seatback 6. The back frame 26 (corresponding to "the seat frame") forms a seat framework of the seatback 6. The back frame 26 has a lateral plate body 36. The lateral plate body 36 is disposed at a lateral side of the backboard 8 to form a seat lateral.

The lateral plate body 36 is a flat plate member, and has a protruding portion 34. The protruding portion 34 extends toward the seat lateral side L. The protruding portion 34 is formed by a cut formed along the lateral plate body 36 (in a vertical direction in FIG. 1). The protruding portion 34 is formed by raising a rear edge of the cut obliquely laterally with respect to the lateral plate body 36 (inclination angle θ 3 is less than 90°).

The hook member 40A (40i, 40m and 40o) has a pinching portion 44 that pinches the lateral plate body 36, a fixing portion 46 having a hooking portion 42 that can be hooked on the protruding portion 34, and an introduction portion 48A.

The introduction portion 48A is defined by making a lower part (free end 40ob) of an outer plate piece 40o into a large curved shape according to a seat profile and close to the backboard 8. The free end 40ob is preferably formed into a curved or bent shape so as to continue to the backboard 8 arranged in the back side of the seat back 6 without forming difference in level from the backboard 8 (for example, to be in the same level as a level of the backboard 8).

Figure 4:
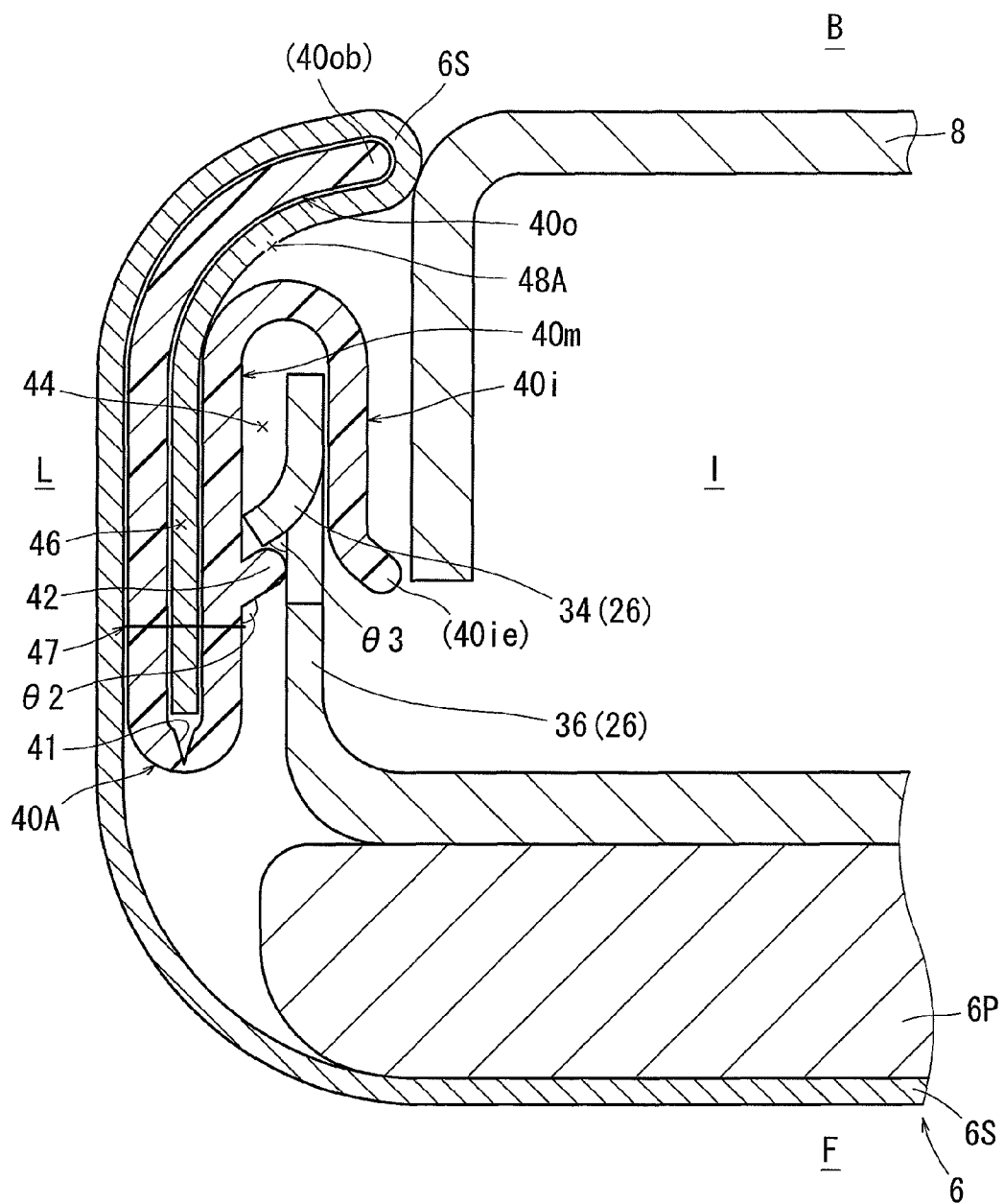
FIG. 4 is a longitudinal section view along a line IV-IV in FIG. 1.

Referring to FIG. 4, a surface side of the seat back 6 is covered by the upholstery material 6S. One end of the upholstery material 6S is disposed in the fixing portion 46 in an opened state. Then the fixing portion 46 is closed to grasp the one end of the upholstery material 6S. In this condition, the fixing portion 46 can be penetratingly sewed and thus fixed together with the upholstery material 6S.

Then, while the hooking portion 42 is in a hooked state on the protruding portion 34, the lateral plate body 36 is pinched by the pinching portion 44 of the hook member 40A. Thus, the upholstery material 6S is stretched along an outer surface of the introduction portion 48A while being adjacent (approximately contacting) to the backboard 8. The upholstery material 6S is greatly curved to a backboard 8 side within the introduction portion 48A. Then, the curved upholstery material 6S is fixedly accommodated in the fixing portion 46 in an opposed configuration on the lateral side L (outer side) with respect to the lateral plate body 36.

According to the latch structure, the upholstery material 6S can be stretched in accordance with a seat profile. Moreover, the upholstery material 6S can be stretched without any gap while adjacent (approximately contacting) to the backboard 8. Therefore, the upholstery material 6S can be beautifully latched on the seatback 6.

ALTERNATIVE EMBODIMENTS

The hook member and the latch structure of the upholstery material of the embodiment are not limited to the previously described embodiments, and therefore it is possible to adopt various other embodiments.

(1) The protruding portion 34 is configured so that the protruding portion extends to the seat front or the seat lateral (seat outside) with respect to each plate body. The protruding portion may have a different configuration if the hook member can be hooked on the protruding portion. That is, the protruding portion can be formed by raising a cut in each plate body to a seat inside.

The protruding portion can be formed by folding a lower end of the plate body to the seat inside or seat outside.

The protruding portion can be formed using a protruding piece being a separate member from the plate body.

(2) A plurality of protruding portions 34 can be provided in each plate body. For example, the plate body can have a first protruding portion protruded to the seat outside, and a second protruding portion protruded to the seat inside. In this case, the pinching portion of the hook member also has a first hooking portion that can be hooked on the first protruding portion, and a second hooking portion that can be hooked on the second protruding portion. Thus, the hook member can be more firmly fixed to the plate body.

(3) As previously described, the introduction portion 48 is defined by a curved configuration. The introduction portion can be appropriately modified depending on a profile of the pad member. For example, in the case of an angular seat cushion or seat back, the introduction portion can be defined by a winding configuration in accordance with a seat profile.

(4) As previously described, the hook member 40 (40A) latches the upholstery material 4S (6S) on a part of the seat cushion 4 (seatback 6). The hook member can be attached to any portion if a seat frame is configured by a plate body. For example, when a seat frame along the whole circumference of the seat cushion (for example, lateral frame 24r or 24l) has a plate body, the hook member can be attached so as to surround the whole circumference of the seat cushion. In this case, a hook member having a sufficient length dimension to surround the whole circumference of the seat cushion is appropriately used.

On the other hand, when the hook member is attached to a part of the plate body, a short hook member is used.

(5) In the first embodiment, the hook member 40 is attached to a full width area at a forward side of the front plate body 32 (including two curved ends). In such a case, the hook member can be configured such that a through hole or a cutout portion is provided at a portion corresponding to each of the curved portions so as to be easily curved.

(6) As previously described, the fixing portion 46 of the hook member 40 is sewed and thus fixed together with the upholstery material 4S (6S). The present invention is not limited to this configuration, thus other means such as a staple or a bolt, or adhesion means such as an adhesive or fusing can be used, if it can fix the upholstery material to the fixing portion.

What is claimed is:

1. A hook member for latching an upholstery material of a vehicle seat comprising a seat frame having a plate body, the hook member comprising:

an inner plate piece, an intermediate plate piece and an outer plate piece;

a pinching portion that pinches the plate body;

a fixing portion that fixes the upholstery material; and an introduction portion configured to define an opening that enables the upholstery material to extend into the fixing portion, wherein the pinching portion includes the inner plate piece and the intermediate plate piece, wherein the fixing portion includes the outer plate piece and the intermediate plate piece, faces an outer side of the plate body when the plate body is pinched by the pinching portion, and is configured to fix the upholstery material between the outer plate piece and the intermediate plate piece, wherein the outer plate piece is longer than the intermediate plate piece, defines the introduction portion and is configured to extend downwardly and inwardly in a length dimension towards the seat frame, and wherein a lower-most portion of the outer plate piece serves as a lower-most portion of the hook member so as to hide the pinching portion when the upholstery material is fixed in the fixing portion.

2. The hook member according to claim 1, wherein the pinching portion includes a hooking portion configured to connect with a protruding portion extending from the plate body.

3. The hook member according to claim 1, wherein the outer plate piece extends downwardly and inwardly to the lower-most portion of the outer plate piece.

4. A vehicle seat comprising:

a seat frame having a plate body, the plate body including a protruding member;

a seat cushion proximate the seat frame;

a fabric member adjacent the seat cushion; and a hook member having an inner plate piece, an intermediate plate piece, an outer plate piece, and a hook portion, wherein the hook portion is configured to connect to the protruding member to secure connection of the hook member to the seat frame, wherein the outer plate piece and the intermediate plate piece define a fixing portion and are configured to fix the fabric member therebetween, and wherein the outer plate piece is longer than the intermediate plate piece, defines an introduction portion and is configured to extend downwardly and inwardly in a length dimension towards the seat frame, and wherein a lower-most portion of the outer plate piece serves as a lower-most portion of the hook member so as to hide the inner plate piece and the intermediate plate piece when the fabric material is fixed in the fixing portion.

5. The vehicle seat according to claim 4, wherein the outer plate piece and intermediate plate piece are connected by a hinge portion.

6. The vehicle seat according to claim 5, wherein the hinge portion has a groove shape.

7. The vehicle seat according to claim 4, wherein at least one of the outer plate piece and the intermediate plate piece is sewn to the fabric member.

8. The vehicle seat according to claim 4, wherein the outer plate piece extends downwardly and inwardly to the lower-most portion of the outer plate piece.

* * * * *

UNITED STATES PATENT AND TRADEMARK OFFICE
CERTIFICATE OF CORRECTION

| | | |
|---|---|---|
| PATENT NO. | : 7,891,735 B2 | |
| APPLICATION NO. | : 12/259499 | |
| DATED | : February 22, 2011 | |
| INVENTOR(S) | : K. Oku | |

It is certified that error appears in the above-identified patent and that said Letters Patent is hereby corrected as shown below:

At column 8, line 11 (claim 4, line 14) of the printed patent, "therebetween, and wherein" should read --therebetween, wherein--.

Signed and Sealed this
Fourth Day of October, 2011

David J. Kappos
*Director of the United States Patent and Trademark Office*